United States Patent Office 3,484,412
Patented Dec. 16, 1969

3,484,412
THERMOPLASTIC COPOLYUREAS BASED UPON 1 - AMINO - 3 - AMINOMETHYL - 3,5,5 - TRIMETHYLCYCLOHEXANE
Peter Borner, Altlunen, Germany, assignor to Schering Aktiengesellschaft, Berlin, Germany
No Drawing. Filed Oct. 14, 1966, Ser. No. 586,672
Claims priority, application Germany, Oct. 22, 1965, Sch 37,910
Int. Cl. C08g 22/02
U.S. Cl. 260—77.5         4 Claims

ABSTRACT OF THE DISCLOSURE

The thermoplastic copolyureas of this invention essentially consist of a plurality of units which repeat themselves and correspond to the formula

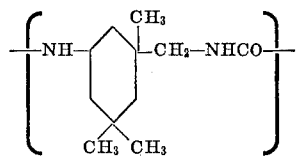

and units which correspond to the formula

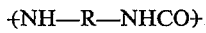

In this formula R stands for a straight chain alkylene radical of 4 to 19 carbon atoms, or for alkylene radicals of 4 to 19 carbon atoms, carrying at least one alkyl substituent, or for radicals of the formula

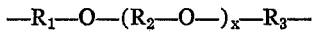

wherein $R_1$, $R_2$, $R_3$ stand for alkylene radicals of at least 2 carbon atoms, $x$ is 0, or 1, or 2 and for diamines of hydrocarbon radicals for dimerized fatty acids.

---

This invention relates to novel thermoplastic copolyureas and a process for preparing such copolyureas by polycondensation of aliphatic and cycloaliphatic diamines with derivatives of carbonic acid. Although numerous processes for preparing polyureas have been disclosed and particularly the hitherto disclosed aliphatic polyureas have certain outstanding characteristics in comparison with other thermoplastic artificial materials, due to certain disadvantageous properties, said aliphatic polyureas could not attain commercial importance. In processing these polymers from the melt, for example in presses, injection molding and extrusion processes, particular disadvantages resulted from the usually too narrow processing range between melting temperature and decomposition temperature.

Although in some cases it has been possible to obtain, by co-condensation of various aliphatic diamines, copolyureas which can be processed without difficulty from the melt, which, however, due to the highly amorphous character of the copolymers, show relatively low dimensional stability at elevated temperature and relatively low mechanical strength, stiffness and hardness and cold flow.

Furthermore, from the German Auslegeschrift No. 1,099,165 it has been known to prepare alicyclic copolyureas from urea and diamines which contain in the molecule two cyclohexyl groups, such as, for example, 4,4'-diaminodicyclohexylalkane, the melting range of said copolyureas being adjustable to a certain extent by the mixing proportion of the starting materials. However, the mechanical properties of these products, particularly the stress to impact are not satisfactory.

1,4 - diaminocyclohexane and 1,4-diaminomethylcyclohexane have been mentioned in British Patent No. 530,267 in a listing of diamines which are suitable for the preparation of polyureas.

Co-condensation of 4,4' - diaminodicyclohexylmethane and various aliphatic diamines is described in the British Patent No. 985,107.

It has now been discovered that according to the present invention high-molecular thermoplastic polyureas can be prepared, which are distinguished by a surprisingly favorable combination of good transparency, high mechanical strength (including also stress to impact), stiffness and hardness and particularly high dimensional stability at elevated temperatures, in comparison with the above mentioned known polyureas.

This process for preparing thermoplastic copolyureas by co-condensation of aliphatic and cycloaliphatic diamines and derivatives of carbonic acid, i.e. urea, urea compounds, phosgene, carbon dioxides and carbonic acid diesters, according to conventional methods, is characterized in that 1-amino-3-aminomethyl-3,5,5-trimethylcyclohexane (I)

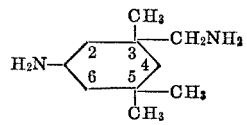

is reacted, together with one or more co-diamines, namely
 (1) Aliphatic, straight chain diamines having 4 to 19 C-atoms;
 (2) Aliphatic straight-chain diamines having 5 to 20 C-atoms of the general Formula II:

$$H_2N—R—NH_2 \qquad (II)$$

wherein R is an alkylene radical having in the chain 4–19 C-atoms and carries at least one alkyl-substituent of not more than 10 C-atoms;
 (3) Etherdiamines of the general Formula III:

$$H_2N—R_1—O—(R_2—O—)_x—R_3—NH_2 \qquad (III)$$

in which $R_1$, $R_2$, and $R_3$ are alkylene radicals having at least 2 C-atoms, and may also carry lower alkyl radicals having 1–4 C-atoms, and wherein X may stand for 0, 1, or 2, and thereby, in case X stands for 0, the total number of the C-atoms is at least 5;
 (4) Diamines which have been prepared from dimerized fatty acids.

As preferred examples of aliphatic straight-chain diamines, 1,6-diaminohexane, 1,8-diamino-octaine, 1,9-diamino-nonane 1,10-diaminodecane, and 1,12-diaminododecane are mentioned.

As examples of aliphatic diamines which carry alkyl substituents, the following are mentioned: 1,6-diamino-2-methylhexane; 1,6-diamino-2,2,4- or 2,4,4-trimethylhexane; 1,8-diamino-2-n-butyl-octane; 9-aminostearylamine; 10-amino-stearylamine; 9-aminomethylstearylamine and 10-aminomethylstearylamine.

Suitable etherdiamines are, for example, 1,2-bis-(3-aminopropoxy) - ethane; 1,2 - bis - (3 - aminopropoxy)-propane; 1,3 - bis - (3 - aminopropoxy) - propane; 2,2-dimethyl - 1,3 - bis - (3 - aminopropoxy) - propane; bis-(4-aminobutyl)-ether 1,4-bis-(3-aminopropoxy)-butane.

In preparing the polyureas according to the invention, co-condensation of the diamine-components with urea or urea compounds is preferred. As urea compounds, the reaction products of the diamines with 1 or 2 mols urea, i.e., ω-aminoalkylureas, or ω,ω'-diureido-compounds of the diamines or mixtures thereof can be used.

However, the products of the invention can be also prepared by reaction of the diamine components with $CO_2$ under pressure and continuous or stepwise removal of the reaction water formed. Furthermore, it is possible to react the diamine components with carbonic acid dialkyl esters or carbonic acid diarylesters, or with phosgene, according to a process known by itself, with recovery of the polyureas embodying the present invention.

It is of particular advantage to carry out the process of this invention by reacting the mixture of diamines with urea in a vessel provided with stirrer, in the atmosphere of a protecting gas, e.g. nitrogen, in the temperature range of 120–135° C. with splitting off first an amount of about 1 mol $H_3N$.

In order to avoid a subsequent cross-linking, it is, as a rule, of advantage to avoid in the first reaction phase premature rising of the temperature, i.e. prior to splitting off about 1 mol $H_3N$.

Subsequently, in the second reaction phase, the reaction mixture is heated to 180 to 240° C. In order to bring about further splitting off of $H_3N$, in the third reaction phase vacuum is applied until the desired melt viscosity is attained.

Polycondensation can be carried out also in solution in a suitable solvent, for example cresol. Furthermore, the first reaction phase can be carried out in a solvent, for example water or cresol.

In attaining improved thermostability, the use of viscosity stabilizing substances in preparing the polyureas, is of advantage. As examples of such substances, difficultly volatile, monofunctional compounds, such as amines, or carboxylic acids, or sulfonic acids are used. For example, stearyl amine, stearic acid, β-naphthalenesulfonic acid, and N-pelargonylnonamethylenediamine are mentioned. Stearic acid hydrazide has also been previously suggested as a viscosity stabilizing substance.

To the copolyureas embodying this invention, other substances, such as antioxidants, UV-stabilizers, pigments, dyes and filling materials can be added.

The characteristics of the copolymers according to the present invention are decisively influenced by the mixing proportions of the diamines used in preparing said copolymers, particularly by the concentration of 1-amino-3-aminomethyl-3,5,5-trimethylcyclohexane in the reaction mixture. This cyclohexane-derivative is used in general in an amount of 1 to 60% by weight, particularly in an amount of 10–40% by weight of the total weight of diamines used for polymerization.

In comparison with the known, purely aliphatic copolyureas based on straight chain alkylenediamines and on alkylenediamines carrying an alkylsubstituent, upon increasing the proportion of said cyclohexane derivative, the mechanical properties of the copolymer—such as the yield stress, modulus of elasticity, hardness and particularly the dimensional stability at elevated temperature, are extraordinarily improved and the cold flow is reduced.

A favorable effect—which is surprising in view of the asymmetrical structure of the molecule—of the 1-amino-3-aminomethyl - 3,5,5 - trimethylcyclohexane - component, can be observed also in connection with the mechanical characteristics of the copolyureas embodying this invention, in comparison with various aliphatic cycloaliphatic copolyureas based on other cyclohexane derivatives, such as, for example, 1,4-diaminocyclohexane, 1,4-diaminomethylcyclohexane and 4,4′-diaminodicyclohexylmethane.

In the following table, the mechanical characteristics and the second order transition temperatures of copolyureas prepared, by way of example, from equal parts by weight of nonamethylenediamine and various cyclohexane derivatives, are stated. The beforementioned copolymers are of an essentially amorphous character and their dimensional stability at elevated temperature is to a large extent determined by the position of the second order transition temperature of the material.

COPOLYUREAS FROM NONAMETHYLENEDIAMINE AND CYCLOHEXANE RINGS-CONTAINING DIAMINES (COMPONENT X)

| Component X (Part by weight in copolymers=22%) | Second order transition temperature,° C. | Yield stress, kg./cm.² | Ball indentation hardness, kg./cm.² | Modulus of elasticity, kg./cm.² |
| --- | --- | --- | --- | --- |
| Polyurea according to the invention: $H_2N$—(cyclohexane with $CH_3$, $CH_2CH_2$, $CH_3$, $CH_3$) | 125 | 680 | 860 | 18,400 |
| Substances compared: $H_2N$—$CH_2$—⟨⟩—$CH_2NH_2$ | 95 | 570 | 675 | 14,800 |
| $NH_2$—⟨⟩—$CH_2$—⟨⟩—$NH_2$ | 110 | 610 | 650 | 15,500 |

The effect of the 1-amino-3-aminomethyl - 3,5,5 - trimethylcyclohexane—which is equally excellent also in other proportions by weight in the co-components—renders it possible to prepare products in which the valuable characteristics of the purely aliphatic copolyureas, particularly the resistance to impact, are retained, because already in the presence of relatively small amounts of 10–25% of this cyclohexane derivative in the copolymers, satisfactory dimensional stability at elevated temperature, stiffness and hardness are attained.

The products embodying the present invention show even under relatively long stress at elevated temperatures low tendency of crystallization, due to which transparency and superficial gloss of the material are well preserved also at elevated temperature.

By using the novel cycloaliphatic co-component, products having a high melt viscosity can be prepared, which are very well suitable for being processed by screw extruders and blow molding machines. The novel products of this invention are used also for being processed in molding presses and injection molding machines. The melting points of the copolyureas according to the invention depend on the aliphatic co-components used and on the co-condensation ratio and are in the range between 150 and 250° C., usually between 180 and 230° C. so that a sufficiently wide temperature range for processing is secured. Prior to processing, the copolymers of the invention should be well dried, e.g. under vacuum of 1–15 Torr at 70–100° C.

The following examples, to which the invention is not limited, serve to further illustrate the invention. In said examples, the relative solution viscosities were determined in 1% solutions in m-cresol at 20% C.; the second order transition temperature was determined from the temperature dependency of the shear modulus and of the mechanical loss factor of chilled foils according to DIN 53445; the yield stress and the tear resistance were determined in standard test bars STIII according to DIN 53504 at a tear rate of 100 mm./min.; the modulus of elasticity was determined, according to DIN 53371, in shoulder bars of a thickness of 4 mm.; the hardness was determined by the ball indentation method according to DIN 53456, and the impact strength (notched test) was determined in standard bars having a U-notch of 0.6 mm. according to DIN 53453. In the polycondensation the anhydrous diamines mentioned in the examples are with reference to the added urea adjusted in the stoichiometric proportion in accordance with their content in amino-groups determined from their amine number, so that small deviations from the theoretical proportions result.

The 1-amino-3-aminomethyl-3,5,5-trimethylcyclohexane can be prepared by the addition of HCN to isophorone and hydrogenation of the resulting 3-cyan-3,5,5-trimethyl-cyclohexanone under pressure at elevated temperature in the presence of $H_3N$ in a manner known by itself.

EXAMPLE 1

In a reaction vessel provided with stirring means, in an atmosphere of pure nitrogen 794 g. nonamethylenediamine, 170 g. of 1-amino-3-aminomethyl-3,5,5-trimethylcyclohexane (mol-ratio 5:1), 360 g. urea, and 6.75 g. stearic acid are heated under fast stirring for 2 hours at 130° C. Thereby the urea is dissolved with evolution of $H_3N$. Subsequently, the reaction mixture is heated with strong evolution of $H_3N$ and increase of the temperature in the vessel from 130° C. to 240° C. within 40 minutes. The molten reaction mass is kept for about one additional hour at 240° C. until the evolution of $H_3N$ is almost completely ended and polycondensation is then terminated by applying within one hour a vacuum slowly increasing to 5 Torr. A crystal clear polyurea of good tenacity is thus obtained, which melts at 200–210° C. and has a relative solution viscosity $\eta$ rel. of 3.51; a yield stress of 640 kg./cm.$^2$; an impact strength (notched test) of 22 kg./cm.$^2$; and a ball indentation hardness of 665 kg./cm.$^2$. The second order transition temperature of the product is 100° C.

EXAMPLE 2

1074 g. of nonamethylenediamine, 385 g. of 1-amino-3-aminomethyl - 3,5,5 - trimethylcyclohexane (mol ratio 3:1) and 20.4 g. stearic acid hydrazide and 542 g. urea are stirred at 130° C. under pure nitrogen for 2 hours. The molten reaction mass is then heated within 15 minutes to 240° C. and at 240° C. for 1 hour. At this temperature a vacuum, which is increased to 5 Torr within 1 hour, is applied. The squeezed out polycondensate is colorless and transparent. It has a solution viscosity $\eta$ rel. of 2.81; a second order transition temperature of 125° C.; a yield stress of 680 kg./cm.$^2$; a ball indentation hardness of 860 kg./cm.$^2$; an impact strength (notched test) of 12 kg./cm.$^2$; and a modulus of elasticity of 18400 kg./cm.$^2$. The melting range is 205–215° C.

EXAMPLE 3

706 g. nonamethylenediamine, 383 g. of 1-amino-3-aminomethyl-3,5,5-trimethylcyclohexane (mol-ratio 2:1) and 25.6 of stearic acid hydrazide and 405 g. urea are polycondensed in a manner analogous to that described in the above Example 2, but with a heating period of 60 minutes, from 130° C. to 240° C. The result is a colorless and transparent product having a melting range of 206 to 213° C.; a solution viscosity $\eta$ rel. of 3.34; a yield stress of 705 kg./cm.$^2$ and a ball indentation hardness of 940 kg./cm.$^2$. The second order transition temperature is 132–136° C.

EXAMPLE 4

181 g. of nonamethylenediamine, 48.6 g. of 1-amino-3-aminomethyl-3,5,5-trimethylcyclohexane, 45.2 g. of a mixture of 2,2,4- and 2,4,4-trimethylhexamethylenediamine (mol-ratio 4:1:1) and 1.91 g. of stearic acid hydrazide are polycondensed with 102.7 g. of urea under conditions analogous to those described in the above Example 1. The resulting transparent copolymer has a second order transition temperature of 100° C.; a yield stress of 598 kg./cm.$^2$; a ball indentation hardness of 832 kg./cm.$^2$ and a solution viscosity $\eta$ rel. of 2.10.

EXAMPLE 5

78.9 g. of hexamethylenediamine, 152 g. of a mixture of 9- and 10-aminomethyl-stearylamine, 28.9 g. of 1-amino-3-aminomethyl - 3,5,5 - trimethylcyclohexane (mol-ratio 4:3:1), 1.77 g. stearic acid hydrazide, and 81.6 g. of urea, are heated in an atmosphere of pure nitrogen under stirring for 30 minutes at 130° C.; then within 5 minutes to 180° C.; 10 minutes at 180° C. and within 10 minutes to 240° C. This last mentioned temperature is maintained for additional 40 minutes. Subsequently, a vacuum which is slowly increased to 5 Torr within 45 minutes, is applied. The result is a transparent copolymer which has a second order transition temperature of 70° C.; a yield stress of 510 kg./cm.$^2$; a solution viscosity $\eta$ rel. of 2.64; and a ball indentation hardness of 605 kg./cm.$^2$.

EXAMPLE 6

21.4 g. of dodecamethylenediamine, 9.1 g. of 1-amino-3 - aminomethyl - 3,5,5 - trimethylcyclohexane (mol-ratio 2:1)), 0.52 g. of stearic acid hydrazide and 9.6 g. of urea, are heated in a cylindrical glass vessel under stirring for one hour at 130° C.; in the last 10 minutes, part of the reaction mixture precipitates in the form of a flocculent precipitate. By increasing the temperature within 10 minutes to 180° C. a clear melt is obtained. The latter is heated for additional 30 minutes at 180° C., the temperature is increased within 15 minutes to 240° C. and the melt is kept for an additional hour at this temperature until the evolution of $H_3N$ ceases. Under a vacuum slowly increased to 2 Torr, within 60 minutes a transparent product is obtained, which melts at 195–200° C., has a solution viscosity of $\eta$ rel. of 2.10, a second order transition temperature of 115° C. and a yield stress of 530 kg./cm.$^2$.

EXAMPLE 7

14.4 g. of octamethylenediamine, 8.5 g. of 1-amino-3-aminomethyl-3,5,5-trimethylcyclohexane (mol-ratio 2:1) and 0.40 g. of stearic acid hydrazide are polycondensed with 9.0 g. of urea in a manner analogous to that described in the above Example 6. Toward the end of the first reaction phase a precipitate is formed, which, however, is dissolved within 15 minutes in the melt, by increasing the temperature from 130 to 200° C. The reaction mixture is then further heated for 15 minutes at 200° C. and subsequently within 10 minutes to 240° C. Then, the further condensation phases described in the above Example 6, follow. The resulting tough-viscous crystal clear product has a solution viscosity of $\eta$ rel. of 2.12, a second order transition temperature of 135° C. and melts at 195–203° C. The yield stress amounts to 623 kg./cm.$^2$.

EXAMPLE 8

17.6 g. of decamethylenediamine, 5.7 g. of 1-amino-3-aminomethyl-3,5,5-trimethylcyclohexane (mol-ratio 3:1), 0.39 g. of stearic acid hydrazide and 8.0 g. of urea are reacted under stirring in a cylindrical glass vessel for 2 hours at 130° C. Toward the end of the first reaction phase a precipitate is formed which is dissolved in the melt by increasing the temperature from 130° C. to 240° C. within 35 minutes. The further condensation phases described in the above Example 6 follow then. A crystal clear high polymer is thus obtained, which has a solution viscosity $\eta$ rel. of 2.07. The second order transition temperture is 105° C., and the melting range is 200–207° C.

EXAMPLE 9

16.5 g. of 1,4-bis-(3-aminopropoxy)-butane, 13.7 g. of 1-amino-3-aminomethyl-3,5,5-trimethylcyclohexane (mol-ratio 1:1), 0.27 g. of N-pelargonyl-nonamethylenediamine and 9.7 g. of urea, are subjected to polycondensation in the manner described in the above Example 1. The colorless, transparent product has a yield stress of 605 kg./cm.$^2$ and a solution viscosity of η rel. of 1.93. The second order transition temperature is at 105° C.

EXAMPLE 10

218.5 g. of a mixture of 9- and 10-aminomethylstearylamine, 85.0 g. of 1-amino-3-aminomethyl-3,5,5-trimethylcyclohexane (mol-ratio 1.5:1), 1.92 g. of stearic acid are reacted with 75.0 g. urea for 2 hours at 140° C. Subsequently, the clear melt is heated within 15 minutes to 240° C. and within 80 minutes at 240° C. and the polycondensation is terminated by a vacuum which is slowly increased to 2 Torr within 60 minutes and by maintaining said vacuum of 2 Torr for 50 additional minutes. A crystal clear, colorless copolymer results, which has a solution viscosity η rel. of 2.53. The yield stress amounts to 440 kg./cm.$^2$ and the ball indentation hardness to 577 kg./cm.$^2$. The second order transition temperature is at 95° C.

EXAMPLE 11

In a cylindrical glass vessel, under stirring and in an atmosphere of pure nitrogen, 14.2 g. nonamethylenediamine, 3.1 g. of 1amino-3-aminomethyl-3,5,5-trimethylcyclohexane (mol-ratio 5:1), 0.25 g. stearylamine and 23.3 g. of carbonic acid diphenylester are reacted within 90 minutes at 140° C. The reaction mixture is heated in 10 minutes to 180° C., 40 minutes at 180° C. and within 40 minutes to 240° C. with distilling off phenol. The temperature is kept for one additional hour at 240° C. and, subsequently, the residual phenol is distilled off within 70 minutes in a vacuum slowly increased to 5 Torr and polycondensation is terminated. The transparent, tough-viscous co-polymer has a solution viscosity η rel. of 2.78 and has a yield stress of 590 kg./cm.$^2$. The second order transition temperature is at 95° C.

EXAMPLE 12

200 g. of nonamethylenediamine, 42.8 g. of 1-amino-3-aminomethyl-3,5,5-trimethylcyclohexane (mol-ratio 5:1) and 0.85 g. of stearic acid hydrazide are introduced into an autoclave provided with stirring means, in an atmosphere of pure nitrogen, and a CO$_2$-pressure of 185 atmospheres (above the ordinary atmospheric pressure) is applied. The reaction mixture is heated within 100 minutes to 230° C. Thereby the pressure increases to 315 atmospheres (above the ordinary atmospheric pressure). The reaction is continued in the autoclave for 20 hours at 230° C. Thereby, the reaction water is removed by slight opening of the discharge valve and corresponding continuous introduction of CO$_2$ over the feed valve and maintaining a pressure of 315 atmospheres (above ordinary atmospheric pressure).

After releasing the pressure from the autoclave, under further stirring at 230° C., within 45 minutes a vaccum slowly increasing to 8 Torr is applied and maintained for 30 additional minutes. After airing the autoclave with nitrogen, a tough-viscous, transparent copolyurea is squeezed out, which melts at 195–208° C. and has a second order transition temperature of 100° C. and a yield stress of 560 kg./cm.$^2$.

It will be understood from the above that the thermoplastic copolyureas embodying this invention essentially consist of a plurality of units repeating themselves and corresponding to the formula

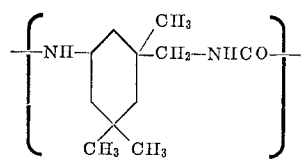

and/or to the formula

 V and, if desired, to the formula

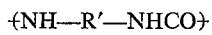 VI wherein R and R' stand for a radical selected from the group consisting of (a) straight chain alkylene radicals of 4 to 19 C atoms; (b) alkylene radicals of 4 to 19 C atoms carrying at least one alkyl substituent selected from the group consisting of lower, medium and higher alkyl substituents; (c) radicals corresponding to the formula

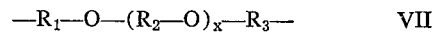 VII wherein R$_1$, R$_2$ and R$_3$ are alkylene radicals of at least 2 C-atoms, which may be substituted by lower alkyl substitutents of 1 to 4 C-atoms and wherein $x$ may stand for 0, 1 or 2 and in case $x$ stands for 0, the total number of the C-atoms is at least 5; and (d) diamines of hydrocarbon radicals from dimerized fatty acids.

EXAMPLE 13

In a cylindrical glass vessel, under stirring and in atmosphere of pure nitrogen, 18.0 g. of the diureido compound of nonamethylenediamine, 5.8 g. nonamethylenediamine, 6.2 g. 1-amino-3-aminomethyl-3,5,5 - trimethylcyclohexane (corresponding to a mol-ratio of the diamines of 3:1) and 0.45 g. stearic acid hydrazide, are introduced and heated within 70 minutes to 240° C. with splitting off ammonia. This temperature is further maintained for 1 hour at 240° C. and polycondensation is subsequently terminated in a vacuum slowly increasing to 5-torr within 60 minutes. The polyurea thus obtained has a solution viscosity of η rel. of 2.31, a yield stress of 656 kg./cm.$^2$ and a second order transition temperature of 120° C.

EXAMPLE 14

In a cylindrical glass vessel, 26.6 g. of diamine (amine number 210), 8.5 g. 1-amino-3-aminomethyl-3,5,5,-trimethylcyclohexane (mol ratio of the diamines 1:1), 6.0 g. urea and 1.53 g. stearic acid hydrazide are introduced and heated to 240° C. within 100 minutes. Said 26.6 g. of diamine were obtained by dimerizing tall oil fatty acids, separation of the dimeric fatty acid from the reaction mixture, nitrilation of the dimeric fatty acid with ammonia and hydrogenation of the dinitrile formed. The temperature of 240° C. is then further maintained for 1 hour and subsequently polycondensation is terminated under a vacuum increasing to 1 torr within 60 minutes. The copolyurea thus obtained has a solution viscosity of η rel. of 1.72, a yield stress of 225 kg./cm.$^2$ and a second order transition temperature of 60° C.

EXAMPLE 15

158.0 g. of nonamethylenediamine and 34.0 g. of 1-amino - methyl-3,5,5 - trimethylcyclohexane (mol-ratio 5:1) are dissolved in 3600 cc. benzene. 121.0 g. liquid phosgene are likewise dissolved in 720 cc. of toluene and 99.7 g. of sodium hydroxide are dissolved in 3600 cc. of water. The solution of the amines in benzene, the tolene solution of phosgene and the aqueous solution of sodium hyroxide, are uniformly dropped in a volume proportion of 5:1:5 under very vigorous stirring within 260 minutes into a reaction vessel which is cooled from the outside. Before the beginning of the reaction a mixture of the solvents benzene, toluene and water, is placed in the reaction vessel in a volume proportion of 5:1:5. During dropping in the reactants, the temperature of the entire liquid in the reaction vessel is kept at 15–20° C. by intensive cooling. In the course of the reaction, the polyurea precipitates as a white powder. This precipitate is separated from the solvent mixture by centrifuging and washing several times with benzene. The dried product is treated with steam, sucked off and washed free from chlorine. A white pulverulent polyurea is thus obtained, which—in 1% solution in concentration sulfuric acid—has a relative solution viscosity of 1.2.

As stated above (see column 3, paragraph 4) polycondensation can be carried out also in solution in a suitable solvent, e.g. cresol. The cresol used as solvent, may consist of an individual isomer or of any mixture of isomeric cresols.

The recitation "Component X (part by weight in copolymers=22%)" in the table (in column 4) of this specification means that the diamines listed in the first vertical column of the table are present in an amount of 22% of the respective copolyureas formed from nonamethylenediamine and one of the compounds disclosed in said first vertical column.

The parts and percent named herein are by weight if not otherwise stated.

What is claimed is:

1. Thermoplastic copolyureas essentially consisting of a plurality of units repeating themselves and corresponding to the formula

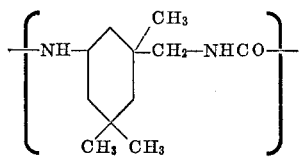
IV and units corresponding to the formula

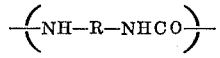
V wherein R stands for a radical selected from the group consisting of (a) straight chain alkylene radicals of 4 to 19 C-atoms; (b) alkylene radicals of 4 to 19 C-atoms carrying at least one alkyl substituent of not more than 10 carbon atoms; (c) radicals of the formula

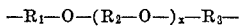
VI wherein $R_1$, $R_2$, $R_3$ stand for alkylene radicals of at least 2 C-atoms and the value of $x$ is selected from the group consisting of 0, 1, and 2, and (d) diamines of hydrocarbon radicals from dimerized fatty acids.

2. Thermoplastic copolyureas as claimed in claim 1, wherein alkylene radicals are substituted by alkyl radicals of 1–4 C-atoms.

3. Thermoplastic copolyureas as claimed in claim 1, in which $x$ in Formula VII has the value of 0 and the total number of carbon atoms is at least 5.

4. Thermoplastic copolyureas as claimed in claim 1, containing also repeating units of the formula

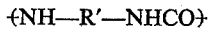
VI wherein R′ has the same meaning as R.

References Cited

UNITED STATES PATENTS

| | | | |
|---|---|---|---|
| 3,352,913 | 11/1967 | Schmitt et al. | 260—78 X |
| 3,294,759 | 12/1966 | Gabler | 260—78 |

FOREIGN PATENTS

| | | |
|---|---|---|
| 717,151 | 8/1965 | Canada. |
| 709,896 | 5/1965 | Canada. |
| 985,106 | 3/1965 | Great Britain. |
| 985,107 | 3/1965 | Great Britain. |

DONALD E. CZAJA, Primary Examiner

C. W. IVY, Assistant Examiner

U.S. Cl. X.R.

260—18, 45.7, 45.9